United States Patent

Hugl et al.

[11] 4,339,380
[45] Jul. 13, 1982

[54] AZO DYESTUFFS

[75] Inventors: Herbert Hugl; Gerhard Wolfrum; Winfried Mennicke; Karl H. Schündehütte, all of Leverkusen; Jochen Westphal, Duesseldorf, all of Fed. Rep. of Germany

[73] Assignee: Bayer Aktiengesellschaft, Leverkusen, Fed. Rep. of Germany

[21] Appl. No.: 93,946

[22] Filed: Nov. 14, 1979

[30] Foreign Application Priority Data

Nov. 29, 1978 [DE] Fed. Rep. of Germany ....... 2851575

[51] Int. Cl.$^3$ ...................... C09B 29/08; C09B 29/26
[52] U.S. Cl. ................................ 260/207.1; 260/205; 260/206; 260/207
[58] Field of Search ............. 260/205, 206, 207, 207.1

[56] References Cited

U.S. PATENT DOCUMENTS

| 2,782,186 | 2/1957 | Merian | 260/205 X |
| 2,967,858 | 1/1961 | Merian et al. | 260/205 |
| 4,019,858 | 4/1977 | Conger | 260/205 X |
| 4,046,757 | 9/1977 | Meybeck et al. | 260/207 |
| 4,148,791 | 4/1979 | Altermatt | 260/207.1 |
| 4,163,013 | 7/1979 | Hugl et al. | 260/205 |

FOREIGN PATENT DOCUMENTS 901692 12/1958 United Kingdom .

Primary Examiner—Paul F. Shaver

Attorney, Agent, or Firm—Sprung, Horn, Kramer & Woods

[57] ABSTRACT

Dyestuffs of the formula

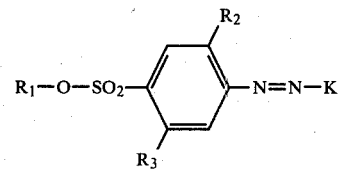

wherein
$R_1$ represents alkyl or aryl,
$R_2$ represents halogen, CN, $CF_3$, $NO_2$, $Q_1$, $-OQ_1$, $-CONQ_1Q_2$ or $-NHCOQ_1$,
$R_3$ represents halogen, CN, $CF_3$, $Q_1$ or $-OQ_1$ and
K represents the radical of an aniline coupling component and wherein
$Q_1$ denotes alkyl or aryl and
$Q_2$ denotes hydrogen, alkyl or aralkyl possess very high tinctorial strength and are outstandingly suitable for dyeing polyester fibres, which are dyed in clear orange-red to red shades having good fastness to light, wet treatment and sublimation. The alkyl, aralkyl and aryl radicals mentioned may be further substituted by nonionic groups or by the radical COOH.

3 Claims, No Drawings

AZO DYESTUFFS

The invention relates to dyestuffs, free from sulphonic acid groups and ammonium groups, of the formula

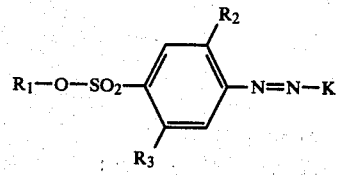

wherein
$R_1$ represents alkyl or aryl,
$R_2$ represents halogen, CN, $CF_3$, $NO_2$, $Q_1$, $-OQ_1$, $-COOQ_1$, $-CONQ_1Q_2$ or $-NHCOQ_1$,
$R_3$ represents halogen, CN, $CF_3$, $Q_1$ or $-OQ_1$ and
K represents the radical of an aniline coupling component which couples in the 4-position,
and wherein
$Q_1$ denotes alkyl or aryl and
$Q_2$ denotes hydrogen, alkyl or aralkyl.

The alkyl, aralkyl and aryl radicals mentioned may be further substituted by nonionic groups or by the radical COOH.

Suitable alkyl for the process of the present invention is in particular alkyl with 1 to 4 C atoms, which can optionally be monosubstituted by cyano, halogen, such as chlorine, bromine or fluorine, hydroxyl or $C_1$-$C_4$-alkoxy, for example methyl, ethyl, n-propyl, iso-propyl, n-butyl, tert.-butyl, cyanoethyl or 2-chloroethyl.

Suitable aryl is in particular phenyl which is optionally monosubstituted, disubstituted or trisubstituted by halogen, $C_1$-$C_4$-alkyl, $C_1$-$C_4$-alkoxy, nitro, cyclohexyl or phenyl.

"Bulky" radicals are present only in those positions where they do not cause any steric hindrance, for example tert.-butyl in the m- or p-position of a phenyl radical.

Suitable halogen is chlorine, bromine and fluorine, but preferably chlorine.

Suitable aralkyl is, for example, benzyl or phenethyl.

Preferred dyestuffs correspond to the formula

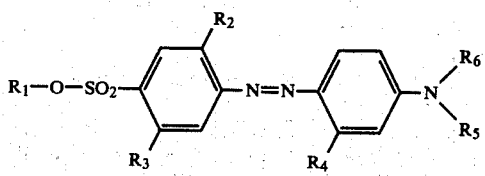

wherein
$R_4$ represents hydrogen, halogen, alkyl, $-NHCOQ_1$, $-NHSO_2Q_1$, $-NHCONH_2$, $-NHCONQ_1Q_2$, $-NHCOCF_3$, $-NHCOOQ_1$, alkoxy or $-O-SO_2-Q_1$,
$R_5$ and $R_6$, which may be identical or different, represent hydrogen, $C_1$-$C_4$-alkyl, $C_1$-$C_4$-alkylene-O-CO-$Q_1$, $C_1$-$C_4$-alkylene-O-CO-O-$Q_1$, $C_1$-$C_4$-alkylene-CO-O-$Q_1$, $C_1$-$C_4$-alkylene-CONQ$_1$Q$_2$, $C_1$-$C_4$-alkylene-O-$Q_1$, $C_1$-$C_4$-alkylene-O-CO-NH-$Q_1$, $C_1$-$C_4$-alkylene-O-SO$_2$-$Q_1$, aralkyl, $-CH_2-CH=CH_2$ or $-CH_2CH_2CN$ and
$R_1$, $R_2$, $R_3$, $Q_1$ and $Q_2$ have the abovementioned meaning.

Particularly preferred dyestuffs are those of the formula

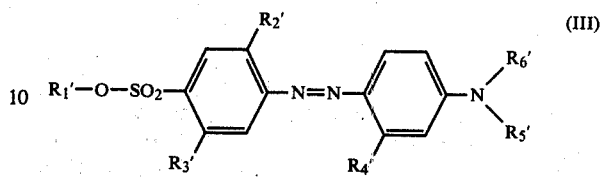

wherein
$R_1'$ represents phenyl, which is optionally monosubstituted, disubstituted or trisubstituted by $C_1$-$C_4$-alkyl or halogen,
$R_2'$ represents halogen, CN, $CF_3$, $NO_2$, $C_1$-$C_4$-alkyl or $C_1$-$C_4$-alkoxy,
$R_3'$ represents halogen, CN, $CF_3$, $C_1$-$C_4$-alkyl or $C_1$-$C_4$-alkoxy,
$R_4'$ represents $-NHCOQ_1'$, $-NHSO_2Q_1'$, $-NHCONH_2$, $-NHCONQ_1'Q_2'$, $-NHCOCF_3$, $-NHCOOQ_1'$ or $-O-SO_2-Q_1'$,
and
$R_5'$ and $R_6'$, which may be identical or different, represent $C_1$-$C_4$-alkylene-O-CO-$Q_1'$, $C_1$-$C_4$-alkylene-O-CO-O-$Q_1'$, $C_1$-$C_4$-alkylene-COOQ$_1'$, $C_1$-$C_4$-alkylene-O-CO-NHQ$_1'$, $C_1$-$C_4$-alkylene-O-SO$_2$-$Q_1'$ or $-CH_2CH_2-CN$,
$Q_1'$ denotes $C_1$-$C_4$-alkyl, phenyl, chlorophenyl or tolyl and
$Q_2'$ denotes hydrogen or $C_1$-$C_4$-alkyl.

Very particularly preferred dyestuffs are those of the formula

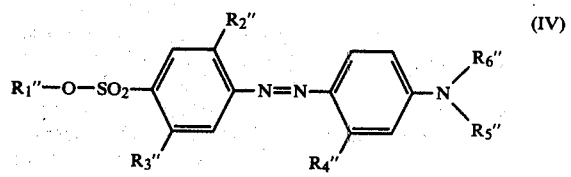

wherein
$R_1''$ represents phenyl, tolyl or chlorophenyl,
$R_2''$ and $R_3''$ represent chlorine,
$R_4''$ represents $-NHCOCH_3$, $-NHCOC_2H_5$, $-NHCOC_3H_7$, $-NHCOC_4H_9$, $-NHCOC_6H_5$, $-NHSO_2CH_3$, $-NHSO_2C_4H_9$ or $NHSO_2C_6H_5$
and
$R_5''$ and $R_6''$, which may be identical or different, represent $-C_2H_4-O-CO-CH_3$, $-C_2H_4-O-COC_2H_5$, $-C_2H_4-O-CO-C_6H_5$, $-C_2H_4-O-CO-O-CH_3$, $-C_2H_4-O-CO-O-C_2H_5$, $-C_2H_4-O-CO-NH-CH_3$, $-C_2H_4-O-CO-NH-C_4H_9$, $-C_2H_4-O-CO-NH-C_6H_5$ or $-C_2H_4CN$.

The new dyestuffs are prepared in a manner which is in itself known, for example by diazotising an aniline (V) and coupling the product with a coupling component (VI).

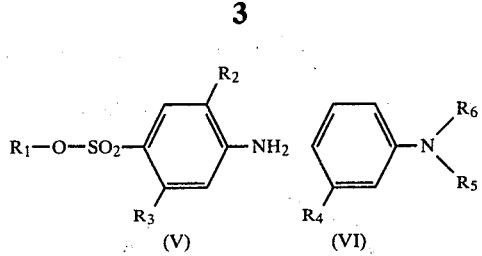

The diazo components (V) can be prepared in accordance with known methods, for example by reacting an anilinesulphonic acid halide with a phenol in alkaline solution (compare German Offenlegungsschrift No. 2,715,135, German Offenlegungsschrift No. 2,239,614 and British Patent No. 901,692). The coupling components (VI) are in most cases known (compare, for example, British Pat. No. 1,125,683, U.S. Pat. No. 4,039,522, U.S. Pat. No. 4,083,685, Japanese Pat. No. 5,007,822, German Offenlegungsschrift No. 2,361,487 and German Offenlegungsschrift No. 2,364,205) or can be prepared in accordance with methods which are in themselves known.

The dyestuffs according to the invention have very high tinctorial strength and are suitable for dyeing synthetic fibre materials, especially polyamides, such as, for example, polycaprolactam, polyhexamethylenediamine adipate or polyaminoundecanoic acid, but very particularly polyesters such as polyethylene terephthalate and poly-1,4-cyclohexanedimethylene terephthalate, from aqueous liquors or organic solvents. Preferably, the new dyestuffs are used for the HT and thermosol dyeing processes. The types of fibres mentioned are dyed in clear orange-red to red shades having good fastness characteristics in use, such as, for example, fastness to light, wet treatment and sublimation.

In the examples which follow, percentages in each case denote percentages by weight.

EXAMPLE 1

110 g of m-cresol are dissolved in 1.5 liters of water at 60° C. and pH 10.5. 497 g of a 52.4% strength moist paste of 2,5-dichloro-aniline-4-sulphonic acid chloride are added in portions, over the course of 45 minutes, to this solution at 60° C. At the same time, the pH value is kept constant at between 10.0 and 10.5 by simultaneous dropwise addition of a total of 100 ml of a 45% strength sodium hydroxide solution. The mixture is then stirred for a further 30 minutes, after which the precipitate obtained is filtered off, washed until neutral and dried at 60° C. in a vacuum drying cabinet. 275 g of 4-amino-2,5-dichlorobenzenesulphonic acid 3-methyl-phenyl ester are obtained.

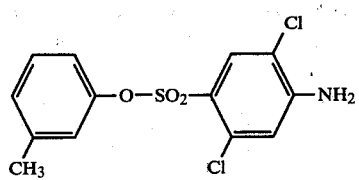

EXAMPLE 2

33.2 g of 4-amino-2,5-dichloro-benzenesulphonic acid 3-methyl-phenyl ester are suspended in 140 ml of 96% strength sulphuric acid at 5° C. 35 g of a 42% strength nitrosylsulphuric acid solution are then added dropwise at 0° to 5° C. in the course of 30 minutes. Stirring is continued for 2 hours at 0° to 5° C., after which the diazotisation mixture is poured out on to 250 g of ice and the excess nitrite is destroyed with amidosulphonic acid. 37 g of the coupling component

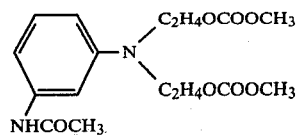

in 300 ml of glacial acetic acid are then run into the mixture over the course of 30 minutes. Stirring is continued for 2 hours, during which the temperature is kept below 10° C. by occasionally adding ice. The pH value is then raised to about 3 by dropwise addition of 45% strength sodium hydroxide solution. The dyestuff which has precipitated is filtered off, washed with water until neutral and free from salt, and dried in a circulating air drying cabinet at 80° C. About 60 g of a dyestuff, of the formula

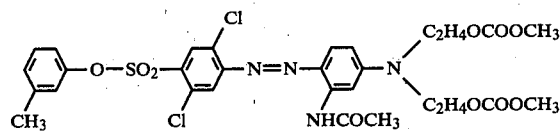

are obtained:

DYEING EXAMPLES (1) 1 Part of the dyestuff which has been obtained according to Example 2 and has been finely dispersed in accordance with customary processes is stirred into 2,000 parts of water. The pH value is brought to 5–6 with acetic acid and 4 parts of ammonium sulphate and 2 parts of a commercial dispersing agent based on a naphthalenesulphonic acid/formaldehyde condensate are added. 100 Parts of a polyester fabric based on polyethylene glycol terephthalate are introduced into the dyeing liquor thus obtained and are dyed for 1½ hours at 120°–130° C. After subsequent rinsing, reductive aftertreatment with an 0.2% strength alkaline sodium dithionite solution for 15 minutes at 60° C., rinsing and drying, a clear, scarlet-red dyeing having good fastness properties, in particular good fastness to light and sublimation, is obtained.

(2) 100 Parts of a fabric of polyethylene terephthalate fibres are introduced, at room temperature, into a dyebath which has been prepared from 1 part of the monoazo dyestuff of Example 2 and 1,000 parts of tetrachloroethylene. The bath is heated to 110° C. in the course of 20 minutes, whilst vigorously circulating the liquor, and is kept at this temperature for 45 minutes. The liquor is then separated off and the fabric is rinsed with fresh tetrachloroethylene at 40° C. After separating off the rinsing liquor, the dyed material is freed from adhering solvent by centrifuging and drying in a stream of air. A strong, scarlet-red dyeing having good general fastness properties is obtained.

(3) 0.1 g of the well-dispersed dyestuff according to Example 2 is introduced, at 40° C., into 1 liter of water which additionally contains 0.2 g of sodium dinaphthylmethanesulphonate and 0.3 g of methyl cresotinate. 10 g of a polyethylene terephthalate fabric are introduced into this bath, the dyebath temperature is raised to 100° C. in the course of about 20 minutes, and the fabric is dyed at this temperature for 60–90 minutes. A scarlet-red dyeing having good fastness to sublimation and to light is obtained.

The monoazo dyestuffs listed in the table which follows exhibit similar properties to the dyestuff obtained according to Example 2. They dye synthetic fibre materials, such as polyester and polyamides, in the stated colour shades, which have good fastness properties, for example good fastness to light, wet treatment and sublimation.

The dyestuffs mentioned in the table correspond to the general formula

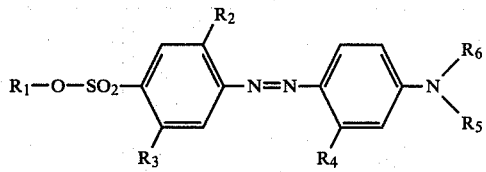

| Example | $R_1$ | $R_2$ | $R_3$ | $R_4$ | $R_5$ | $R_6$ | Colour shade |
|---|---|---|---|---|---|---|---|
| 3 | 3-Cl—$C_6H_4$ | Cl | Cl | NHCOCH$_3$ | $C_2H_4OCOOC_2H_5$ | $C_2H_4OCOOC_2H_5$ | scarlet |
| 4 | $C_6H_5$ | Cl | Cl | NHCOCH$_3$ | $C_2H_4OCOOCH_3$ | $C_2H_4OCOOCH_3$ | " |
| 5 | 3-CH$_3$—$C_6H_4$ | Cl | Cl | NHCOCH$_3$ | $C_2H_4OCOOC_2H_5$ | $C_2H_4OCOOC_2H_5$ | " |
| 6 | $C_6H_5$ | Cl | Cl | NHCOC$_4H_9$ | $C_2H_4OCOCH_3$ | $C_2H_4OCOCH_3$ | " |
| 7 | 2-CH$_3$—$C_6H_4$ | Cl | Cl | NHCOC$_6H_5$ | $C_2H_4OCOC_2H_5$ | $C_2H_4OCOC_2H_5$ | " |
| 8 | 4-Cl—$C_6H_4$ | Cl | Cl | NHSO$_2$CH$_3$ | $C_2H_4OCONHCH_3$ | $C_2H_4OCONHCH_3$ | " |
| 9 | 3-Cl—$C_6H_4$ | Cl | Cl | NHSO$_2$C$_4H_9$ | $C_2H_4OCOOCH_3$ | $C_2H_4OCOOCH_3$ | " |
| 10 | $C_6H_5$ | Cl | Cl | NHCOCH$_3$ | $C_2H_4OCONHC_4H_9$ | $C_2H_4OCONHC_4H_9$ | " |
| 11 | 3-CH$_3$—$C_6H_4$ | Cl | Cl | NHCOC$_3H_7$ | $C_2H_4OCOC_6H_5$ | $C_2H_4OCOC_6H_5$ | " |
| 12 | $C_6H_5$ | Cl | Cl | NHCOCH$_3$ | $C_2H_4CN$ | $C_2H_4OCONHC_6H_5$ | " |
| 13 | 3-Cl—$C_6H_4$ | Cl | Cl | NHSO$_2$C$_6H_5$ | $C_2H_4OCOOCH_3$ | $C_2H_4OCOOCH_3$ | " |
| 14 | 3,5-CH$_3$—$C_6H_3$ | CH$_3$ | CH$_3$ | NHSO$_2$—(4-CH$_3$)—$C_6H_4$ | $C_2H_4OCOCH_3$ | $C_2H_4OCOCH_3$ | " |
| 15 | $C_6H_5$ | CF$_3$ | Cl | NHCONH$_2$ | $C_2H_4CN$ | $C_2H_4OCOOC_2H_5$ | " |
| 16 | 3-CH$_3$—$C_6H_4$ | Br | Br | OSO$_2$C$_6H_5$ | $C_2H_4OCOOC_2H_5$ | $C_2H_4OCOOC_2H_5$ | " |
| 17 | $C_6H_5$ | Cl | Cl | NHCOOCH$_3$ | $C_2H_4COOCH_3$ | $C_2H_4COOCH_3$ | " |
| 18 | $C_6H_5$ | CN | Br | NHCONHC$_6H_5$ | CH$_2$CH(C$_2H_5$)—OCOOCH$_3$ | CH$_2$CH(C$_2H_5$)—OCOOCH$_3$ | red |
| 19 | 3,5-CH$_3$—4-Cl—$C_6H_2$ | Cl | Cl | NHCOCH$_3$ | $C_2H_4OCOCH_3$ | $C_2H_4OCOCH_3$ | scarlet |
| 20 | $C_6H_5$ | Cl | Cl | NHCOCF$_3$ | $C_2H_4OCOOC_2H_5$ | $C_2H_4OCOOC_2H_5$ | scarlet |
| 21 | 3-Cl—$C_6H_4$ | NO$_2$ | Cl | NHSO$_2$C$_4H_9$ | $C_2H_4CN$ | $C_2H_4OCOC_6H_5$ | red |
| 22 | $C_6H_5$ | OCH$_3$ | OCH$_3$ | OSO$_2$CH$_3$ | $C_2H_4OCOOCH_3$ | $C_2H_4OCOOCH_3$ | red |
| 23 | 3-CH$_3$—$C_6H_4$ | CN | CN | NHCOCH$_3$ | $C_2H_4OSO_2C_6H_5$ | $C_2H_4OSO_2C_6H_5$ | red |
| 24 | 4-CH$_3$—$C_6H_4$ | CF$_3$ | CF$_3$ | NHCOCH$_3$ | $C_2H_4OCOCH_3$ | $C_2H_4OCOCH_3$ | scarlet |
| 25 | $C_6H_5$ | Cl | Cl | NHCOCH$_3$ | $C_2H_4OSO_2CH_3$ | $C_2H_4OSO_2CH_3$ | scarlet |
| 26 | 3-Cl—$C_6H_4$ | Cl | Cl | NHCOCH$_3$ | $C_2H_4OSO_2C_4H_9$ | $C_2H_4OSO_2C_4H_9$ | scarlet |
| 27 | $C_6H_5$ | Cl | Cl | NHCOCH$_3$ | H | $C_2H_5$ | scarlet |
| 28 | 3-NO$_2$—$C_6H_4$ | Cl | Cl | H | $C_2H_5$ | CH$_2$C$_6H_5$ | orange |
| 29 | $C_6H_5$ | Cl | Cl | CH$_3$ | $C_2H_4OCH_3$ | $C_2H_4OCH_3$ | yellowish-tinged scarlet |
| 30 | $C_6H_5$ | Cl | Cl | OCH$_3$ | $C_2H_5$ | $C_2H_5$ | yellowish-tinged scarlet |
| 31 | $C_6H_5$ | Cl | Cl | Cl | —CH$_2$—CH=CH$_2$ | —CH$_2$—CH=CH$_2$ | orange-brown |
| 32 | 3-Cl—$C_6H_4$ | Cl | Cl | NHCOCH$_3$ | $C_2H_4OCOOCH_3$ | $C_2H_4OCOOCH_3$ | scarlet | wherein
$R_1'$ represents phenyl, which is optionally monosubstituted, disubstituted or trisubstituted by $C_1$-$C_4$-alkyl or halogen,
$R_2'$ represents halogen, CN, CF$_3$, NO$_2$, $C_1$-$C_4$-alkyl or $C_1$-$C_4$-alkoxy,
$R_3'$ represents halogen, CN, CF$_3$, $C_1$-$C_4$-alkyl or $C_1$-$C_4$-alkoxy,
$R_4'$ represents —NHCOQ$_1'$, —NHSO$_2$Q$_1'$, —NHCONH$_2$, —NHCONQ$_1'$Q$_2'$, —NHCOCF$_3$, —NHCOOQ$_1'$ or —O—SO$_2$—Q$_1'$,
and
$R_5'$ and $R_6'$, which may be identical or different,

We claim:
1. A dyestuff, free from sulphonic acid and ammonium groups, of the formula

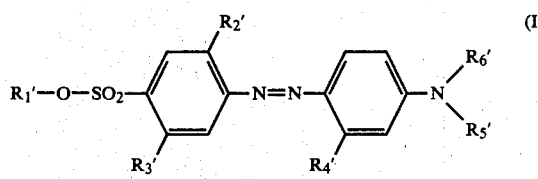

(III)

represent $C_1$-$C_4$-alkylene—O—CO—Q$_1'$, $C_1$-$C_4$-alkylene—O—CO—O—Q$_1'$, $C_1$-$C_4$-alkylene—COOQ$_1'$, $C_1$-$C_4$-alkylene—O—CO—NHQ$_1'$, $C_1$-$C_4$-alkylene—O—SO$_2$—Q$_1'$ or —CH$_2$CH$_2$—CN,
and wherein
Q$_1'$ denotes $C_1$-$C_4$-alkyl, phenyl, chlorophenyl or tolyl and
Q$_2'$ denotes hydrogen or $C_1$-$C_4$-alkyl.
2. A dyestuff according to claim 1, wherein
$R_1'$ represents phenyl, tolyl or chlorophenyl,
$R_2'$ and $R_3'$ represent chlorine, $R_4'$ represents —NHCOCH$_3$, —NHCOC$_2$H$_5$, —NHCOC$_3$H$_7$, —NHCOC$_4$H$_9$, —NHCOC$_6$H$_5$, —NHSO$_2$CH$_3$, —NHSO$_2$C$_4$H$_9$ or NHSO$_2$C$_6$H$_5$ and $R_5'$ and $R_6'$, which may be identical or different, represent —C$_2$H$_4$—O—CO—CH$_3$, —C$_2$H$_4$—O—COC$_2$H$_5$, —C$_2$H$_4$—O—CO—C$_6$H$_5$, —C$_2$H$_4$—O—CO—O—CH$_3$, —C$_2$H$_4$—O—CO—O—C$_2$H$_5$, —C$_2$H$_4$—O—CO—NH—CH$_3$, —C$_2$H$_4$—O—CO—NH—C$_4$H$_9$, —C$_2$H$_4$—O—CO—NH—C$_6$H$_5$ or —C$_2$H$_4$CN.

3. A dyestuff according to claim 1, of the formula

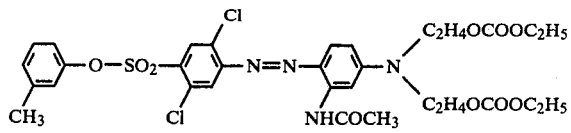

* * * * *